United States Patent [19]

Kenjyo

[11] Patent Number: 4,468,709
[45] Date of Patent: Aug. 28, 1984

[54] DUAL-LOOP JITTER CORRECTION CIRCUIT FOR CORRECTING THE TIME BASE ERROR OF AN INFORMATION SIGNAL

[75] Inventor: Hideyuki Kenjyo, Koganei, Japan
[73] Assignee: Olympus Optical Co. Ltd., Japan
[21] Appl. No.: 302,090
[22] Filed: Sep. 14, 1981
[30] Foreign Application Priority Data
Sep. 17, 1980 [JP] Japan ................................ 55-128879
[51] Int. Cl.³ .......................... H04N 9/44; G11B 7/00
[52] U.S. Cl. .................................. 358/322; 358/325; 358/326; 369/45
[58] Field of Search ....................... 358/325, 326, 337; 360/36.1; 369/45

[56] References Cited
U.S. PATENT DOCUMENTS

| | | | |
|---|---|---|---|
| 3,560,634 | 2/1971 | Diller et al. | 358/325 X |
| 3,580,991 | 5/1971 | Krause | 358/325 |
| 3,637,936 | 1/1972 | Krause | 358/325 |
| 3,820,154 | 6/1974 | Faroudja et al. | 358/326 X |
| 4,057,833 | 11/1977 | Braat . | |
| 4,090,215 | 5/1978 | Buchan et al. | 358/325 |
| 4,193,085 | 3/1980 | Imamura | 358/325 |
| 4,313,129 | 1/1982 | Fukui | 358/325 X |

Primary Examiner—Aristotelis M. Psitos
Attorney, Agent, or Firm—Parkhurst & Oliff

[57] ABSTRACT

In a jitter correction circuit for correcting a time base error caused in a color television signal readout from a video disc due to a fluctuation in a disc rotating speed and an eccentricity of the disc, a first closed loop control circuit includes a first phase difference detector for detecting a first phase deviation of a horizontal synchronizing signal of the color television signal and a first variable time constant lag filter for producing a first control signal in response to the first phase deviation and a second closed loop control circuit includes a second phase difference detector for detecting a second phase deviation of a color burst signal of the color television signal and a second variable time constant lag filter for producing a second control signal in response to the second phase deviation. When the first phase deviation is greater than a predetermined level, only the first control signal is supplied to a voltage controlled oscillator to produce clock pulses for driving a delay device formed by a number of charge coupled devices. When the first phase deviation is reduced to the predetermined level, a sum of the first and second control signals is supplied to the voltage controlled oscillator.

6 Claims, 15 Drawing Figures

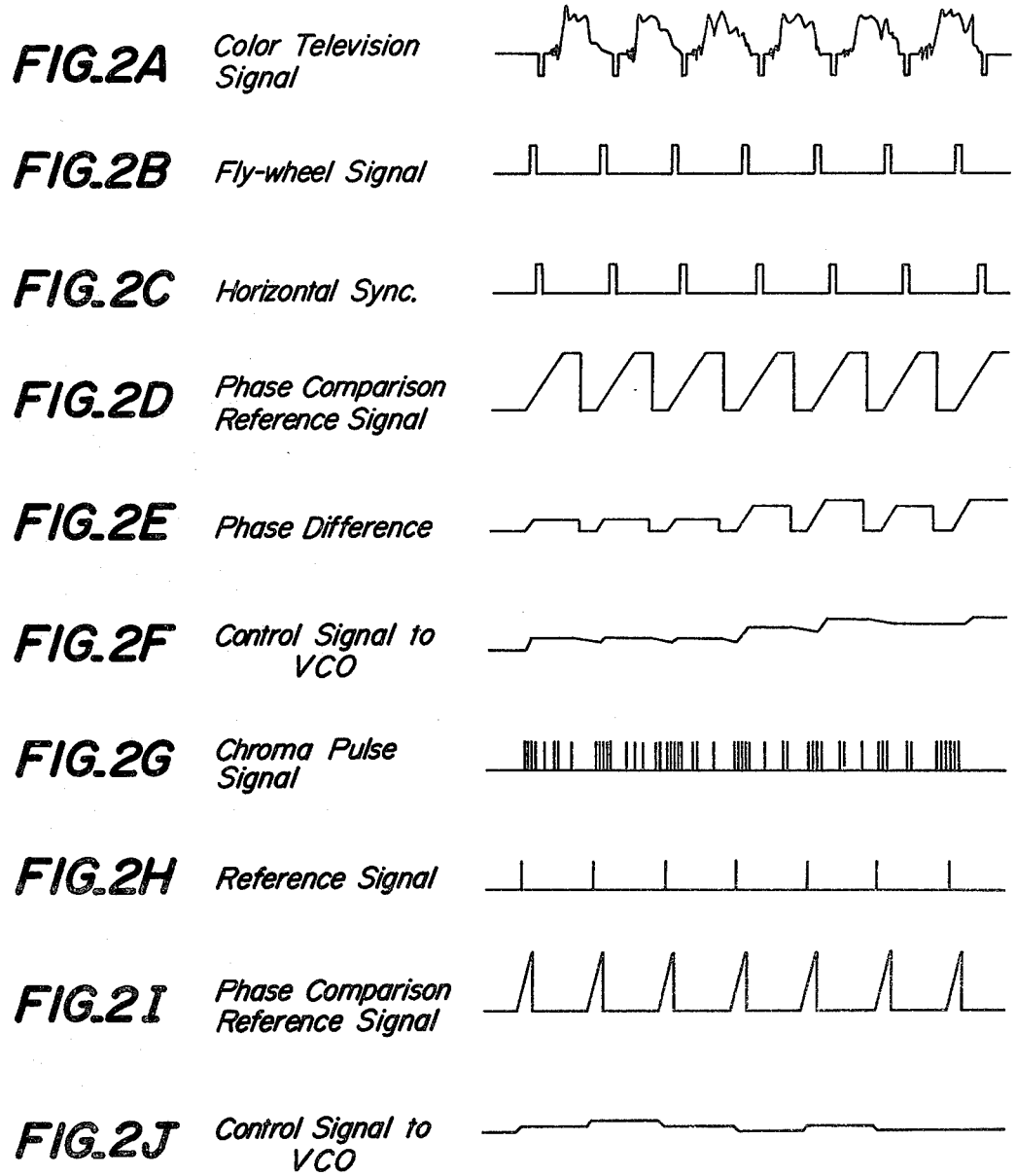

DUAL-LOOP JITTER CORRECTION CIRCUIT FOR CORRECTING THE TIME BASE ERROR OF AN INFORMATION SIGNAL

BACKGROUND OF THE INVENTION

The present invention relates generally to a technique for reproducing optically an information signal recorded on a record medium such as a video disc, and more particularly, to a jitter correction circuit for correcting a time base error of the reproduced information signal due to a fluctuation in a rotating speed of the disc, an eccentricity of the disc, etc.

Usually, such a record medium has recorded therein an information signal which includes a first synchronizing signal of a first frequency and a second synchronizing signal of a second frequency which is higher than the first frequency of the first synchronizing signal. For instance, a video disc has recorded thereon a color television signal of NTSC system having a horizontal synchronizing signal of about 15.75 KHz and a color sub-carrier of about 3.58 MHz which is much higher than said horizontal synchronizing signal frequency.

Heretofore, it has been known to correct the time base error in an optical disc player by means of a servo control system comprising a galvanomirror which deflects a light spot on the disc in a tangential direction to an information track. However, the reliability of the galvanomirror including a rotating shaft is relatively low. In order to improve the reliability, the manufacturing cost of the galvanomirror would be increased. Further, the galvanomirror might produce acoustic noise during operation.

In the actual information reproducing head, it is necessary to provide focussing and tracking servo mechanisms for correcting focussing and tracking errors so as to cause the small light spot to follow the information track accurately. For instance, the focussing servo mechanism may be constituted by a moving coil system and the tracking servo mechanism by a galvanomirror or a device for driving an objective lens in a disc radial direction. Therefore, if the above mentioned tangential galvanomirror for correcting the time base error is provided, the head is liable to be complicated in construction, heavy in weight and expensive in cost. Under these circumstances, it is desired to effect the jitter correction by means of an electronic circuit.

It has been also proposed to compensate the time base error by means of an electronic control system comprising a delay device having an array of charge coupled devices (hereinafter referred as CCD delay device) and a voltage controlled oscillator (VCO) for generating clock pulses for driving the CCD delay device. The electronic control system may be further classified into an open loop system and a closed loop system. In the open loop system, an operational frequency range of the system can be made wider and the system can follow the jitter component in a prompt manner, but there is a problem in a linearity of the VCO for driving the CCD delay device. While in the closed loop system, the linearity of the VCO does not cause any trouble, but it is difficult to obtain a large loop gain due to the fact that the CCD delay device includes an inherent delay time. For instance, if the control is carried out with respect to a horizontal synchronizing signal of a color signal of the NTSC system reproduced from the video disc, it is only possible to limit a residual jitter up to about 80 nsec. to 100 nsec. Although the residual jitter may be further reduced by effecting the control with respect to a color burst signal of the color television signal, a relatively long time is required to draw the system into a controllable state.

SUMMARY OF THE INVENTION

The present invention has for its object to provide a jitter correction circuit which can be rapidly drawn into a controllable state and can reduce the residual jitter up to an extremely low level.

According to the invention, a jitter correction circuit for correcting a time base error of an information signal readout of an optical disc, comprises a first closed loop control circuit having a variable time constant for correcting a delay time of a variable delay device in accordance with a phase difference between a first synchronizing signal and a first reference signal;

a second closed loop control circuit for correcting the delay time of said variable delay device in accordance with a phase difference between a second synchronizing signal of a second frequency and a second reference signal, said second frequency being higher than said first frequency of the first synchronizing signal; and means for driving said second closed loop control circuit into an operative condition when said phase difference between said first synchronizing signal and said reference signal is decreased to a predetermined value.

According to the invention, the first closed loop control circuit detects a phase difference between the first synchronizing signal and the reference signal and when a detector detects an out-of control state, a time constant of a variable time constant lag filter is changed in accordance with a predetermined process. Then a detection signal obtained thereby is supplied to a CCD delay device via a VCO, so that the control circuit can be drawn into a controllable state in a prompt manner and at the same time a substantial part of the jitter is corrected. Then, after the control with the aid of the first closed loop control circuit has finished, the second closed loop control circuit is made operative to derive a control signal from a phase difference between the second reference signal and the second synchronizing signal by means of a variable time constant lag filter and a control signal thus derived is supplied to the CCD delay device via the VCO so as to further decrease a residual jitter.

BRIEF DESCRIPTION OF THE DRAWINGS

FIGS. 2A to 2J are waveforms appearing at various points in the circuit of FIG. 1;

DESCRIPTION OF THE PREFERRED EMBODIMENTS

Figure 1:
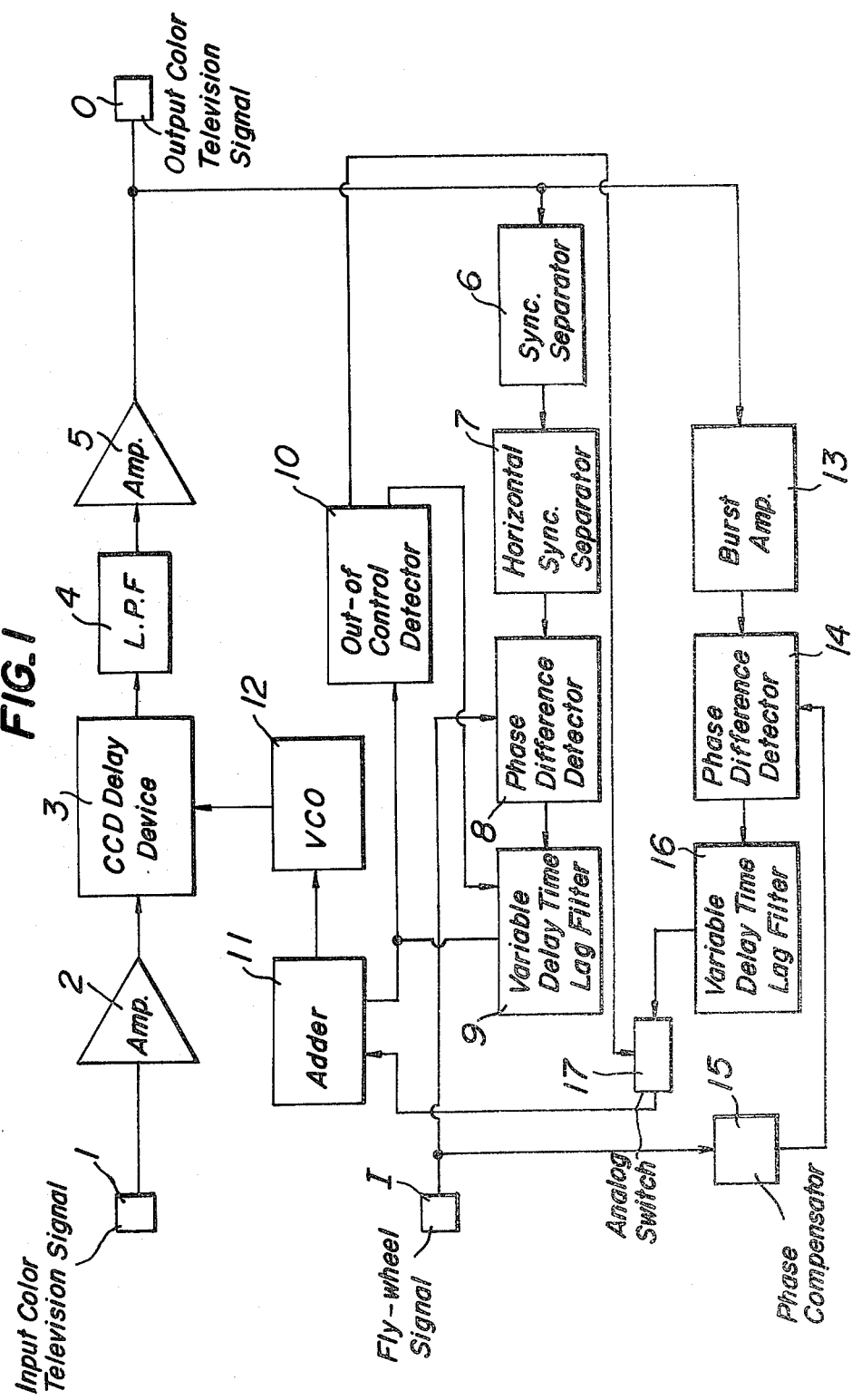
FIG. 1 is a block diagram showing an embodiment of the jitter correction circuit according to the invention.

FIG. 1 shows an embodiment of the jitter correction circuit according to the invention for correcting a jitter caused in a color television signal of an NTSC system read out of a rotating video disc. The picked-up color television signal is supplied to an input terminal 1 and is then supplied through a high frequency amplifier 2 to a CCD delay device 3. The CCD delay device 3 comprises analog shift registers of 910 bits and has a variable delay time from 35 μsec. to 70 μsec. In order to remove clock noise which might be introduced by the CCD delay device 3, the signal is passed through a low pass filter 4. For instance, when the CCD delay device 3 is driven by clock pulses having a repetition frequency of about 10 MHz to 20 MHz, the low pass filter 4 may have a cut-off frequency of 5 MHz. Then the signal is amplified by a high frequency amplifier 5 which produces a standard color television signal of the NTSC system at a video output O. The input color television signal to the amplifier 2 or the output color television signal from the amplifier 5 has a waveform shown in FIG. 2A.

The output color television signal from the high frequency amplifier 5 is supplied to a synchronizing signal separator 6 which extracts synchronizing signals from the color television signal. The synchronizing signals thus separated are supplied to a horizontal synchronizing signal separator 7 and a horizontal synchronizing signal thus extracted is supplied to a first phase difference detector 8 to which is also supplied a fly-wheel signal which has a center frequency equal to that of a standard horizontal synchronizing signal, via an input terminal I from a fly-wheel signal generator not shown. The fly-wheel signal has a waveform shown in FIG. 2B and is used as a timing pulse for producing a phase comparison reference signal generated in the phase difference detector 8. The phase comparison reference signal has a waveform illustrated in FIG. 2D. The horizontal synchronizing signal extracted by the separator 7 has a waveform shown in FIG. 2C and is used as a timing pulse for sampling the phase comparison reference signal. Then, the reference signal is sampled and held to generate a phase error signal as illustrated in FIG. 2E. The phase error signal thus detected is supplied to a variable delay time lag filter 9 which also receives an out-of control signal supplied from an out-of control detector 10. When the detector 10 detects the out-of control state, a time constant of the lag filter 9 is changed in accordance with the phase error so as to change a frequency range of the control loop. Then the lag filter 9 produces a control signal in accordance with the changed time constant and this control signal is supplied through one input of an adder 11 to a control input of a voltage controlled oscillator (VCO) 12. The input signal to the VCO 12 is shown in FIG. 2F. Then the VCO 12 generates clock pulses having a controlled repetition period and the clock pulses are supplied to the CCD delay device 3 as the driving signal. The elements so far explained except for the detector 10 constitutes a first closed loop control circuit. In this control circuit, when the detector 10 detects the out-of control condition, the delay time of the lag filter 9 is changed in accordance with the detected phase difference and thus, the system can be set into a controllable state in a very prompt manner. By means of the first control circuit, the jitter can be suppressed up to 80 nsec. to 100 nsec.

The color television signal from the high frequency amplifier 5 is further supplied to a burst amplifier 13 so as to extract a high frequency chroma signal from the color television signal and then the extracted chroma signal is converted into a pulse signal by means of a limiter included in the burst amplifier 13. The pulse signal thus derived is supplied to a second phase difference detector 14. Since the phase of the color burst signal in the color television signal of the NTSC system changes by 180° every field, the fly-wheel signal is supplied from the input I to the second phase difference detector 14 through a phase compensator 15 which lags or advances alternately the fly-wheel signal by a half period of the color burst signal. This burst signal is supplied from the phase compensator 15 to the second phase difference detector 14 as a second reference signal which has a waveform illustrated in FIG. 2H and is used as a timing pulse for generating a phase comparison reference signal shown in FIG. 2I.

This phase comparison reference signal is sampled and held by a second synchronizing signal which may be a predetermined one pulse in the burst signal supplied from the burst amplifier 13 to detect a phase error. The phase error thus sampled and held is supplied to a second variable delay time lag filter 16 which produces a control signal having a delay time determined by said phase error. The control signal thus produced is depicted in FIG. 2J. The output control signal from the lag filter 16 is supplied through an analog switch 17 to the other input of the adder 11. The analog switch 17 is controlled by the out-of control detector 10 in such a manner that when the amount of out-of control is larger than a predetermined level, i.e. when the phase difference between the horizontal synchronizing signal of the color television signal and the fly-wheel signal is larger than a predetermined value, the switch 17 is closed and thus, the control signal from the second variable time constant lag filter 16 is not supplied to the adder 11, whereas when said phase difference is reduced and reaches said predetermined value (corresponding to the aforesaid residual jitter of 80 nsec–100 nsec) due to the control of the first closed loop control circuit, the switch 17 is made conductive and the control signal is supplied from the lag filter 16 to the adder 11. That is to say, after the control by means of the first closed loop control circuit has been completed, the second closed loop control circuit is made operative and both the control signals supplied from the first and second lag filters 9 and 16 are summed with each other in the adder 11 and the VCO 12 is controlled by the summed control signals.

According to the invention, since a double control loop consisting of the first and second control circuits is provided, and the variable time constant lag filters 9 and 16 are included in the respective control loops, the system can be drawn into the controllable state in a very prompt manner. Further, the two kinds of jitter corrections by means of the horizontal synchronizing signal and the color burst signal having a higher frequency than that of the horizontal synchronizing signal are affected in a superimposed manner, the jitter can be removed to a great extent and a very small residual jitter of about 5 nsec. to 10 nsec. only remains.

By using the jitter correction circuit according to the invention, it is sufficient for an optical head for reading the information from the disc to comprise a tracking error correcting servo mechanism and a focussing error correcting mechanism. For instance, the jitter correction circuit according to the invention may be combined with a pick-up head comprising a galvanomirror for deflecting a beam spot in a radial direction of the disc to effect the tracking control and an objective lens driving device for moving the objective lens in its optical axis direction to effect the focussing control.

Figure 3A:
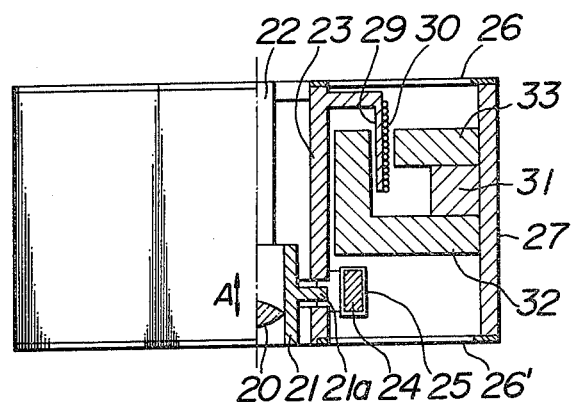
FIGS. 3A and 3B are partially cutaway side and plan views, respectively illustrating an objective lens driving device to which the jitter correction circuit according to the invention is applied.
Figure 3B:
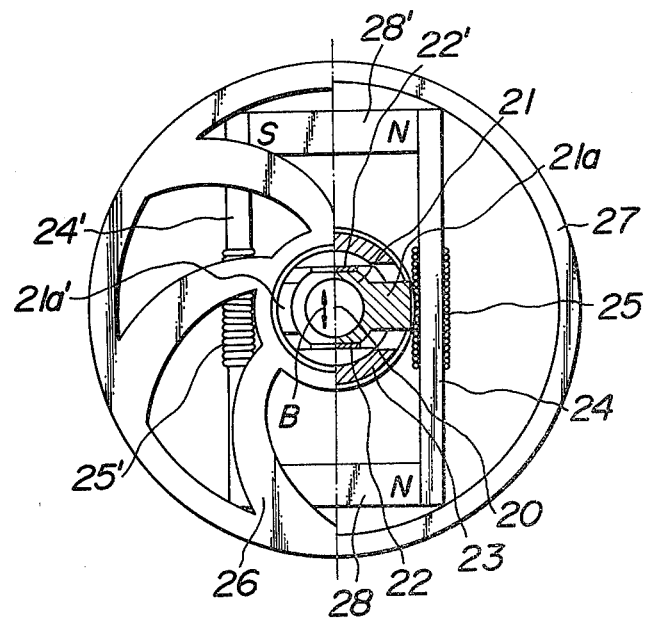
Figure 4A:
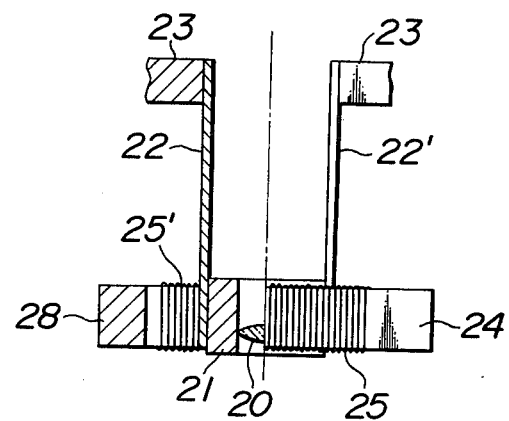
FIG. 4A is a partially cutaway side view showing a lens holding part of the device shown in FIGS. 3A and 3B.
Figure 4B:
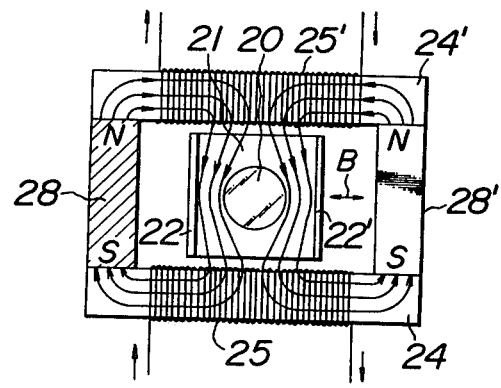
FIG. 4B is a plan view for explaining an operational principle of the lens driving device.

FIGS. 3A and 3B show an embodiment of an objective lens driving device which may be advantageously used together with the jitter correction circuit according to the invention. In this objective lens driving device, it is not necessary to provide a radial mirror as well as a tangential mirror and the objective lens is moved not only in the optical axis direction, but also in the radial direction of the disc.

FIGS. 3A, 3B, 4A and 4B show an embodiment of such an objective lens driving device. In this device, an objective lens 20 is held by a lens holder 21 made of magnetic material and the holder is connected to an intermediate frame 23 by means of a pair of leaf springs 22 and 22'. Thus the objective lens 20 is movable in a direction B in FIG. 3B, i.e. a tracking direction perpendicular to an optical axis of the objective lens 20 as well as to the information track on the disc. The lens holder 21 comprises a pair of projections 21a and 21a' which are projected through slots formed in the intermediate frame 23. First and second yokes 24 and 24' are arranged in such a manner that central portions thereof are opposed with the projections 21a and 21a'. Around the central portions of the first and second yokes are wound first and second coils 25 and 25', respectively. Between both ends of the first and second yokes are arranged first and second permanent magnets 28 and 28'. Thus magnetic fluxes pass through the lens holder 21, first and second yokes 24 and 24' and first and second permanent magnets 28 and 28'. When electric currents corresponding to a tracking error pass through the coils 25 and 25', the lens holder 21 and thus the objective lens 20 is moved in the radial direction B due to a magnetic force. In this manner the tracking error can be compensated for.

The intermediate frame 23 is connected to an outer frame 27 by means of a pair of spiral springs 26 and 26' so that the intermediate frame 23 can be moved in a direction A parallel to the optical axis of the objective lens 20. The yokes 24 and 24' and the permanent magnets 28 and 28' are secured to the outer frame 27 by means of suitable connecting means not shown. The intermediate frame 23 made of magnetic material has a ring 29 formed integrally therewith and a moving coil 30 is wound around the ring. A ring shaped permanent magnet 31 and ring shaped yokes 32 and 33 are secured to the outer frame 27 in such a manner that they form a focussing control system of a so-called moving coil type together with the moving coil 30. When an electric current corresponding to the focussing error is supplied to the coil 30, the intermediate frame 23 and thus the objective lens 20 can be moved in the direction A. In this manner the focussing error can be corrected effectively.

When the jitter correction circuit according to the invention is combined with the objective lens driving device explained above, the tangential, radial and focussing corrections necessary for the reading light spot to follow the information track precisely can be effected without using a very expensive galvanomirror which requires a high precision, and is subjected to the noise problem.

The present invention is not limited to the embodiments mentioned above, but many modifications can be conceived by those skilled in the art within the scope of the invention. For instance, the present invention can be applied to various apparatus using various kinds of optical discs such as a digital audio disc and a digital data disc.

What is claimed is:

1. A jitter correction circuit for correcting a time base error of an information signal read out from an optical disc comprising:

a variable delay device having a variable delay time for correcting the time base error of an information signal;

a first closed loop control circuit having means for deriving a first synchronizing signal of a first frequency from an information signal, means for generating a first reference signal, means for detecting a first phase difference between the first synchronizing signal and the first reference signal, and means for adjusting the delay time of said variable delay device in accordance with the first detected phase difference to correct the time base error of the information signal;

means for detecting said first phase difference and providing a control output when said phase difference is less than or equal to a predetermined value; and a second closed loop control circuit having means for deriving from the information signal a second synchronizing signal of a second frequency higher than said first frequency, means for generating a second reference signal, means for detecting a second phase difference between the second synchronizing signal and the second reference signal, and means responsive to said control output for adjusting the delay time of the variable delay device in accordance with the second detected phase difference to correct the time base error of the information signal, said predetermined value corresponding to a residual time base error.

2. The circuit of claim 1 wherein said variable delay device comprises a voltage controlled oscillator for producing clock pulses and analog shift registers formed from charge coupled devices which are coupled to be driven by said clock pulses from said voltage controlled oscillator.

3. The circuit of claim 2 wherein said means for adjusting the delay time of the variable delay device in accordance with the first detected phase difference comprises a first variable time constant lag filter controlled by said first detected phase difference and coupled to said voltage controlled oscillator to provide a first control signal for adjusting the delay time of the variable delay device, and wherein said means for adjusting the delay time of the variable delay device in accordance with the second detected phase difference comprises a second variable time constant lag filter controlled by said second phase difference and coupled to said voltage controlled oscillator to provide a second control signal for adjusting the delay time of the variable delay device.

4. The circuit of claim 3 further comprising an adder coupled to receive and sum said first and second control signals for providing a third control signal to said voltage controlled oscillator for adjusting the delay time of the variable delay device.

5. The circuit of claim 4 wherein said means responsive to said control output comprises an analog switch responsive to said first phase difference decreasing to said predetermined value for coupling said second control signal to said adder.

6. The circuit of claim 3 wherein said means for deriving a first synchronizing signal comprises means for deriving a horizontal synchronizing signal from a television signal for use as said first synchronizing signal and wherein said means for driving a second synchronizing signal comprises means for deriving a color burst signal from said television signal for use as said second synchronizing signal.

* * * * *